United States Patent
Nezamfar et al.

(10) Patent No.: US 11,178,616 B2
(45) Date of Patent: Nov. 16, 2021

(54) STAGED WIRELESS DEVICE WAKE-UP

(71) Applicant: Atmosic Technologies Inc., Campbell, CA (US)

(72) Inventors: Bita Nezamfar, Sunnyvale, CA (US); Justin Ann-Ping Hwang, Sunnyvale, CA (US); David Kuochieh Su, Saratoga, CA (US)

(73) Assignee: Atmosic Technologies Inc., Campbell, CA (US)

(*) Notice: Subject to any disclaimer, the term of this patent is extended or adjusted under 35 U.S.C. 154(b) by 302 days.

(21) Appl. No.: 16/559,335

(22) Filed: Sep. 3, 2019

(65) Prior Publication Data

US 2020/0077339 A1  Mar. 5, 2020

Related U.S. Application Data

(60) Provisional application No. 62/726,555, filed on Sep. 4, 2018.

(51) Int. Cl.
| | |
|---|---|
| *H04W 52/02* | (2009.01) |
| *H04L 5/10* | (2006.01) |
| *H04W 4/80* | (2018.01) |

(52) U.S. Cl.
CPC ........... *H04W 52/0229* (2013.01); *H04L 5/10* (2013.01); *H04W 4/80* (2018.02); *H04W 52/0274* (2013.01)

(58) Field of Classification Search
CPC .............. H04W 4/80; H04W 52/0229; H04W 52/0274; H04L 5/10

USPC ........................................................ 370/329
See application file for complete search history.

(56) References Cited

U.S. PATENT DOCUMENTS

| | | | |
|---|---|---|---|
| 6,323,775 B1 | 11/2001 | Hansson | |
| 7,230,933 B2 | 6/2007 | Bahl et al. | |
| 8,521,194 B2 | 8/2013 | Laroia et al. | |
| 9,886,658 B1 | 2/2018 | Stanford et al. | |
| 9,949,235 B2 | 4/2018 | Su et al. | |
| 10,038,332 B1 | 7/2018 | Leabman et al. | |
| 2003/0198196 A1 | 10/2003 | Bahl | |
| 2007/0004464 A1 | 1/2007 | Lair et al. | |
| 2009/0017843 A1 | 1/2009 | Laroia et al. | |
| 2009/0275302 A1* | 11/2009 | Huston ................... | H04B 1/24 455/231 |
| 2010/0026469 A1 | 2/2010 | Shiotsu et al. | |
| 2010/0317339 A1 | 12/2010 | Koc | |
| 2011/0260839 A1 | 10/2011 | Cook et al. | |
| 2013/0062965 A1 | 3/2013 | Chernokalov et al. | |
| 2013/0257364 A1 | 10/2013 | Redding | |
| 2014/0003384 A1 | 1/2014 | Zhang et al. | |
| 2014/0246924 A1 | 9/2014 | Proud | |
| 2014/0247148 A1 | 9/2014 | Proud | |

(Continued)

*Primary Examiner* — Angel T Brockman
(74) *Attorney, Agent, or Firm* — Paradice & Li LLP

(57) ABSTRACT

This disclosure provides a method and apparatus for a staged wake-up of a wireless device. The wireless device may include a wireless wake-up receiver and a communication transceiver. The wireless device may begin operations in a low-power mode. The wireless wake-up receiver may identify radio-frequency (RF) activity and transition operation of the wireless device from the low-power mode to an active power mode when RF activity is identified. In some implementations, RF activity is identified when an energy pattern of a received RF signal is matched to an energy pattern associated with a known communication protocol.

19 Claims, 5 Drawing Sheets

(56) References Cited

U.S. PATENT DOCUMENTS

| | | |
|---|---|---|
| 2014/0247152 A1 | 9/2014 | Proud |
| 2015/0163086 A1 | 6/2015 | Saito et al. |
| 2015/0172848 A1* | 6/2015 | Gao .................. H04W 52/0229 455/41.3 |
| 2015/0380974 A1 | 12/2015 | Lin et al. |
| 2016/0099614 A1 | 4/2016 | Leabman et al. |
| 2016/0118805 A1 | 4/2016 | Swope et al. |
| 2016/0128128 A1* | 5/2016 | Ang .................. H04W 52/0235 370/311 |
| 2016/0134150 A1 | 5/2016 | Chen et al. |
| 2016/0285416 A1 | 9/2016 | Tiwari et al. |
| 2017/0012090 A1 | 1/2017 | Hatano et al. |
| 2017/0019851 A1 | 1/2017 | Mackenzie et al. |
| 2017/0110910 A1 | 4/2017 | Zeine et al. |
| 2017/0117754 A1 | 4/2017 | Noori et al. |
| 2017/0181110 A1 | 6/2017 | Belogolovy |
| 2018/0191202 A1 | 7/2018 | Renneberg et al. |
| 2018/0233956 A1 | 8/2018 | Moussaoui et al. |
| 2018/0316225 A1 | 11/2018 | Yeo et al. |
| 2018/0335524 A1 | 11/2018 | Youssef |
| 2019/0044392 A1 | 2/2019 | Chowdhury et al. |
| 2019/0074717 A1 | 3/2019 | Tsukamoto |
| 2019/0181687 A1 | 6/2019 | Su et al. |
| 2019/0181688 A1 | 6/2019 | Su et al. |
| 2019/0181918 A1 | 6/2019 | Pagani |
| 2019/0199145 A1 | 6/2019 | Zeine et al. |

\* cited by examiner

STAGED WIRELESS DEVICE WAKE-UP

CROSS-REFERENCE TO RELATED APPLICATION

This application claims the benefit of commonly owned U.S. Provisional Patent Application No. 62/726,555 entitled "STAGED WIRELESS DEVICE WAKE UP" filed on Sep. 4, 2018, the entirety of which is hereby incorporated by reference.

TECHNICAL FIELD

The present implementations relate generally to wireless communication devices, and specifically to transitioning a wireless communication device from a low-power mode to an active power mode.

BACKGROUND OF RELATED ART

Wireless communication devices may have a limited power source, such as a battery, to provide mobility and convenience. Reducing the power consumption of wireless communication devices may extend battery life and thereby increase the time between battery recharging or replacement. Some operations may negatively impact battery life such as, for example, continually monitoring for communication signals that may or may not be addressed to, or intended for, the wireless communication device.

In some cases, wireless communication devices may transmit a periodic message or beacon. Transmitting periodic messages or beacons when there are no nearby devices to receive such transmissions unnecessarily consumes available power, thereby reducing the battery life. Simply duty-cycling operations of a wireless communication device to avoid transmitting or receiving messages to reduce power consumption may introduce latency problems. For example, the wireless communication device may miss receiving one or more directed communication signals and/or may fail in timely transmitting a periodic message while engaged in such duty-cycled communication operations.

Thus, there is a need to detect the presence of nearby wireless devices prior to performing activities to reduce the power consumption of the wireless communication device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described herein may be implemented as a method for operating a wireless device. The method can include operating the wireless device in a first power mode, identifying radio-frequency (RF) activity in the vicinity of the wireless device, and transitioning the wireless device from the first power mode to a second power mode in response to the identified RF activity, wherein the wireless device consumes more power in the second power mode than in the first power mode. In some implementations, identifying the RF activity can include receiving a first transmission of a first RF signal and the transitioning the wireless device to the second power mode may include demodulating, by a transceiver, a second transmission of the first RF signal; and transitioning the wireless device to the second power mode based on the demodulation of the second transmission of the first RF signal. In some aspects, the first RF signal is at least one of a Bluetooth Inquiry signal, a Bluetooth Low Energy advertising signal, and a phone inquiry signal. In other implementations, identifying the RF activity can include determining a first energy pattern associated with a received RF signal, and comparing the first energy pattern with one or more reference energy patterns indicative of a known wireless communication protocol. In some implementations, the identifying the RF activity can include determining periods of RF activity and periods of RF inactivity associated with a received RF signal, and comparing the determined periods of RF activity and RF inactivity with one or more reference periods of RF activity and RF inactivity. In some aspects, at least one of the one or more reference periods of RF activity and RF inactivity may be indicative of a known wireless communication protocol.

The method can also include transmitting a first wireless message based on the transition from the first power mode to the second power mode, and receiving, from another wireless device, a second wireless message responsive to the first wireless message. In some aspects, the first wireless message identifies the wireless device.

Another innovative aspect of the subject matter of this disclosure may be implemented in a wireless device. The wireless device may include a wake-up receiver configured to detect energy in radio-frequency (RF) signals, a controller, and a memory storing instructions that, when executed by the controller, cause the wireless device to operate in a first power mode, identify RF activity in a vicinity of the wireless device, and transition the wireless device from the first power mode to a second power mode in response to the identified RF activity, wherein the wireless device is configured to consume more power in the second power mode than in the first power mode. In some implementations, the wireless device can identify the RF activity by receiving a first transmission of a first RF signal. Further, the wireless device can demodulate a second transmission of the first RF signal, and transition the wireless device to the second power mode based on the demodulation of the second transmission of the first RF signal. In some aspects, the first RF signal is at least one of a Bluetooth Inquiry signal, a Bluetooth Low Energy advertising signal, a Wi-Fi signal and a phone inquiry signal. In some aspects, the wireless device can determine that the second transmission of the first RF signal is not intended for the wireless device; and transition the wireless device to the first power mode in response to the determination.

Execution of the instructions can also cause the wireless device to transmit a first wireless message based on the transition from the first power mode to the second power mode. Execution of the instructions can further cause the wireless device to receive, from another wireless device, a second wireless message responsive to the first wireless message.

Another innovative aspect of the subject matter described in this disclosure may be implemented by a wireless device. The wireless device may include means for operating the wireless device in a first power mode, means for identifying radio-frequency (RF) activity in a vicinity of the wireless device, and means for transitioning the wireless device from the first power mode to a second power mode in response to the identified RF activity, wherein the wireless device consumes more power in the second power mode than in the first power mode. In some implementations, the means for identifying the RF activity receives a first transmission of a first RF signal. The means for transitioning the wireless device to the second power mode is to demodulate a second transmission of the first RF signal and transition the wireless device to the second power mode based on the demodulation of the second transmission of the first RF signal.

BRIEF DESCRIPTION OF THE DRAWINGS

The example implementations are illustrated by way of example and are not intended to be limited by the figures of the accompanying drawings. Like numbers reference like elements throughout the drawings and specification.

DETAILED DESCRIPTION

Figure 1:
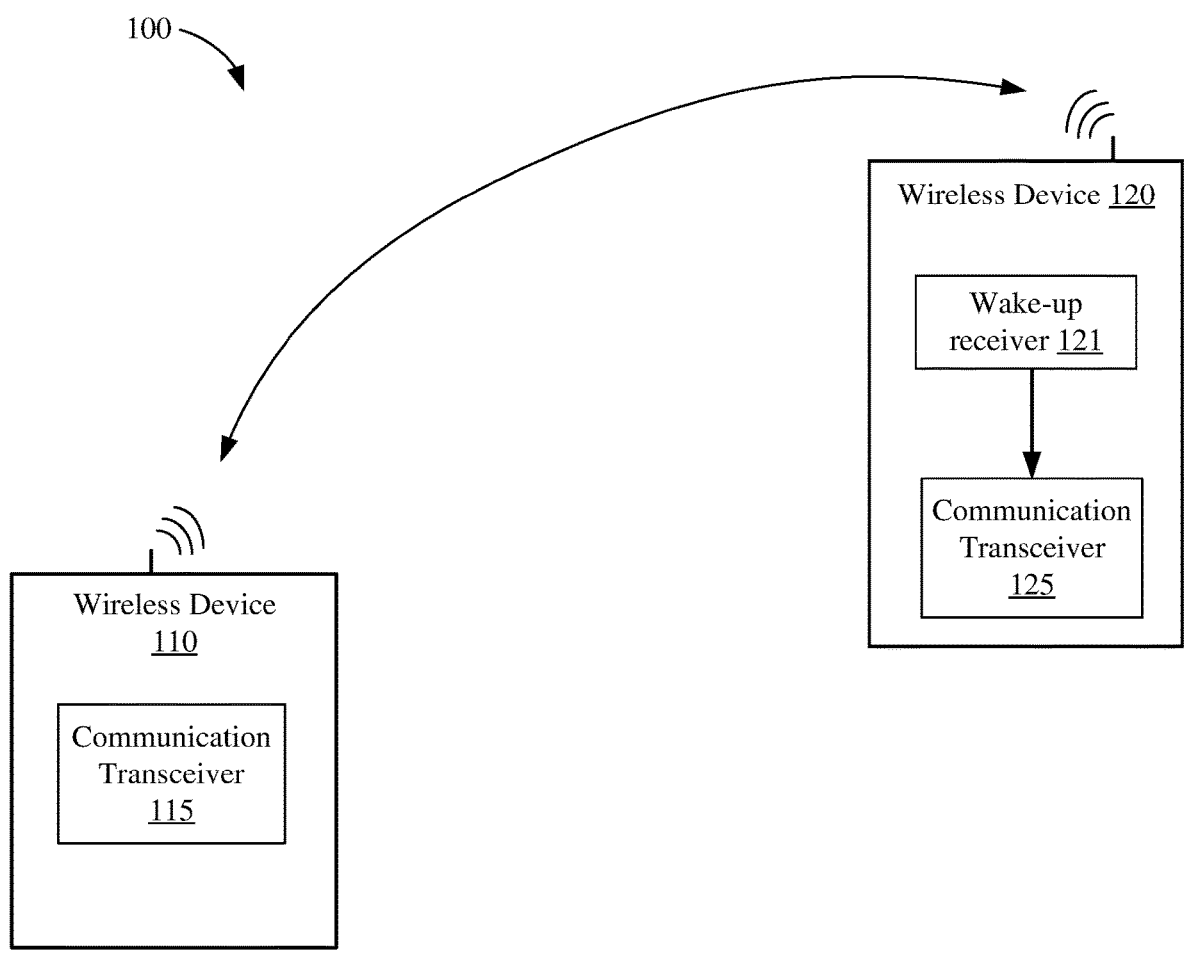
FIG. 1 depicts a wireless communication system within which aspects of the present disclosure may be implemented.

Implementations of the subject matter described in this disclosure may be used to reduce the power consumption of a wireless device by detecting a presence of other nearby wireless devices while operating in a low-power mode. After detecting the presence of other nearby wireless devices, the wireless device may transition from the low-power mode to an active power mode in which one or more circuits, components, or modules that were powered down during the low-power mode are fully powered, thereby allowing the wireless device to perform a number of functions including, for example, exchanging messages with the other nearby wireless devices and performing operations for (or requested by) the other nearby wireless devices. If the wireless device does not detect the presence of other nearby wireless devices, the wireless device may remain in the low-power mode, for example, to conserve power and thereby extend its battery life.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example implementations. However, it will be apparent to one skilled in the art that these specific details may not be required to practice the example implementations. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all implementations defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 depicts a wireless communication system 100 within which aspects of the present disclosure may be implemented. The wireless communication system 100 may include one or more devices such as a first wireless device 110 and a second wireless device 120. The first wireless device 110 and the second wireless device 120 may be any suitable wireless communication device. Example wireless communication devices may include a cell phone, personal digital assistant (PDA), tablet device, laptop computer, or the like. The first wireless device 110 and the second wireless device 120 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single first wireless device 110 and a single second wireless device 120. In other implementations, the wireless communication system 100 may include any technically feasible number of wireless devices. The first wireless device 110 may include a communication transceiver 115 and the second wireless device 120 may include a communication transceiver 125. The first wireless device 110 and the second wireless device 120 may communicate with each other (and with other devices not shown for simplicity) through their respective communication transceivers via one or more technically feasible wireless communication protocols. For example, the first wireless device 110 and the second wireless device 120 may communicate via Wi-Fi, Bluetooth®, Bluetooth Low Energy (BLE), LTE, or any other suitable communication protocol.

In some implementations, the second wireless device 120 may be a battery powered device that can operate in either a low-power mode (also referred to as a reduced power mode) or an active power mode. In other implementations, the second wireless device 120 may be powered solely or substantially by harvested power (e.g., power collected from received radio-frequency signals). In the low-power mode, operations of one or more portions of the second wireless device 120 may be suspended and/or one or more circuits and components of the second wireless device 120 may be powered down to reduce power consumption. In the active power mode, portions of the second wireless device 120 that were powered down in the low-power mode may be powered on, for example, so that the second wireless device 120 is fully operational. For example, in some implementations, one or more transceivers and associated circuitry (such as Wi-Fi transceivers, Bluetooth transceivers, and their associated baseband processors and front-end circuits) of the second wireless device 120 may be powered down when operating in the low-power mode to reduce power consumption and may be powered on when operating in the active power mode to allow for the exchange of data with one or more other wireless devices. Although only two power modes are described here, the second wireless device 120 may operate in any feasible number of power modes. For example, a first power mode may be a zero-power mode where the second wireless device 120 consumes zero or near zero power. A second power mode may consume more power than the first power mode, but less than a fully active mode where all or effectively all of the circuits and modules associated with the second wireless device 120 are powered on. A third power mode may consume more power than the first and the second power modes and still less than the fully active mode, and so on.

The second wireless device 120 may include a wake-up receiver 121. In some implementations, the wake-up receiver 121 may be a receiver configured to receive on-off keying (OOK) modulated radio-frequency (RF) signals. On-off keying uses the presence and absence of RF energy to encode and decode data. In some aspects, another wireless device (such as the first wireless device 110) may generate RF energy to indicate a first logical state (e.g., a logical one), and may not generate RF energy to indicate a second logical state (e.g., a logical zero). In other aspects, the other wireless device may generate RF energy to indicate a logical zero and may not generate RF energy to indicate a logical one. Some OOK RF signals may not be modulated according to Wi-Fi, Bluetooth, BLE, or other communication protocols. Instead, some example OOK RF signals may use an unmodulated carrier signal within a frequency or frequency band from which the wake-up receiver 121 may detect a presence (or absence) of RF energy. Therefore, the wake-up receiver 121 does not need to demodulate received RF signals, but rather may receive and decode RF signals by detecting a presence (or absence) of RF energy. In some implementations, the wake-up receiver 121 may identify RF signals by correlating the detected RF energy with known energy patterns.

In some implementations, the wake-up receiver 121 may consume only a fraction of the power compared to conventional receivers, such as receivers included in the communication transceiver 115 and/or the communication transceiver 125. In some aspects, the reduced power consumption may be due to reduced power requirements (e.g., simplified circuits) for receiving and decoding OOK modulated signals. Therefore, the second wireless device 120 may operate in a low-power mode during which the wake-up receiver 121 remains powered up to detect possible communication signals directed to the second wireless device 120. Having the wake-up receiver 121 powered up while the second wireless device 120 is in the low-power mode may reduce response latency. In some other implementations, the wake-up receiver 121 may be duty-cycled on and off with a high duty cycle instead of remaining powered up to further reduce power consumption.

When the wake-up receiver 121 detects and/or identifies a possible communication signal, the wake-up receiver 121 may cause the second wireless device 120 to transition to an active power mode to respond to the possible communication signal. Transitioning to the active power mode may include powering up one or more circuits, components, or modules of the second wireless device 120 that may have been powered down during the low-power mode. For example, the wake-up receiver 121 may generate a "wake" signal that causes the communication transceiver 125 to receive and demodulate subsequent RF signals. In this manner, the second wireless device 120 may undergo a "staged wake-up." That is, the wake-up receiver 121 may cause the transition of the communication transceiver 125 and/or the second wireless device 120 from the low-power mode to the active power mode. In the active power mode, the second wireless device 120 can determine whether any subsequent RF signals are directed (e.g., addressed) to the second wireless device 120. If an RF signal is not directed to the second wireless device 120, then the second wireless device 120 may return to the low-power mode. Although only two power modes are described here, in other implementations the second wireless device 120 may operate in any technically feasible number of power modes, where each power mode is associated with a different amount of power consumption. Thus, a staged wake-up may include transitioning from any first power mode to any second power mode, where the power consumption of the second power mode is more than the power consumption of the first power mode. In some embodiments, since the wake-up receiver 121 is always on, the second wireless device 120 may quickly respond to any potential RF signal. Although accuracy and/or range of the wake-up receiver 121 may be limited (due in part to a simple design needed to receive OOK signals), quickly transitioning to use of the communication transceiver 125 may reduce response latency as well as power consumption. Thus, the power consumption associated with operating the communication transceiver 125 may be reduced while not trading off overall response latency. In some aspects, duty cycling the communication transceiver 125 (and foregoing the use of the wake-up receiver 121 altogether) may have consume more power than the staged wake-up procedure described above.

In some aspects, the wake-up receiver 121 may operate in frequency bands that may be shared with the communication transceiver 125. For one example, the communication transceiver 125 may include one or more Wi-Fi and/or Bluetooth transceivers that operate within a 900 MHz band, the 2.4 GHz industrial, scientific, and medical (ISM) band, the 5 GHz ISM band, and/or the 60 GHz band. In another example, the communication transceiver 125 may include one or more cellular transceivers that operate within various frequency bands (some of which may overlap frequency bands used by the one or more Wi-Fi and/or Bluetooth transceivers). Thus, the wake-up receiver 121 and the communication transceiver 125 may share the ISM band with other transceivers of other devices, including the first wireless device 110.

Figure 2:
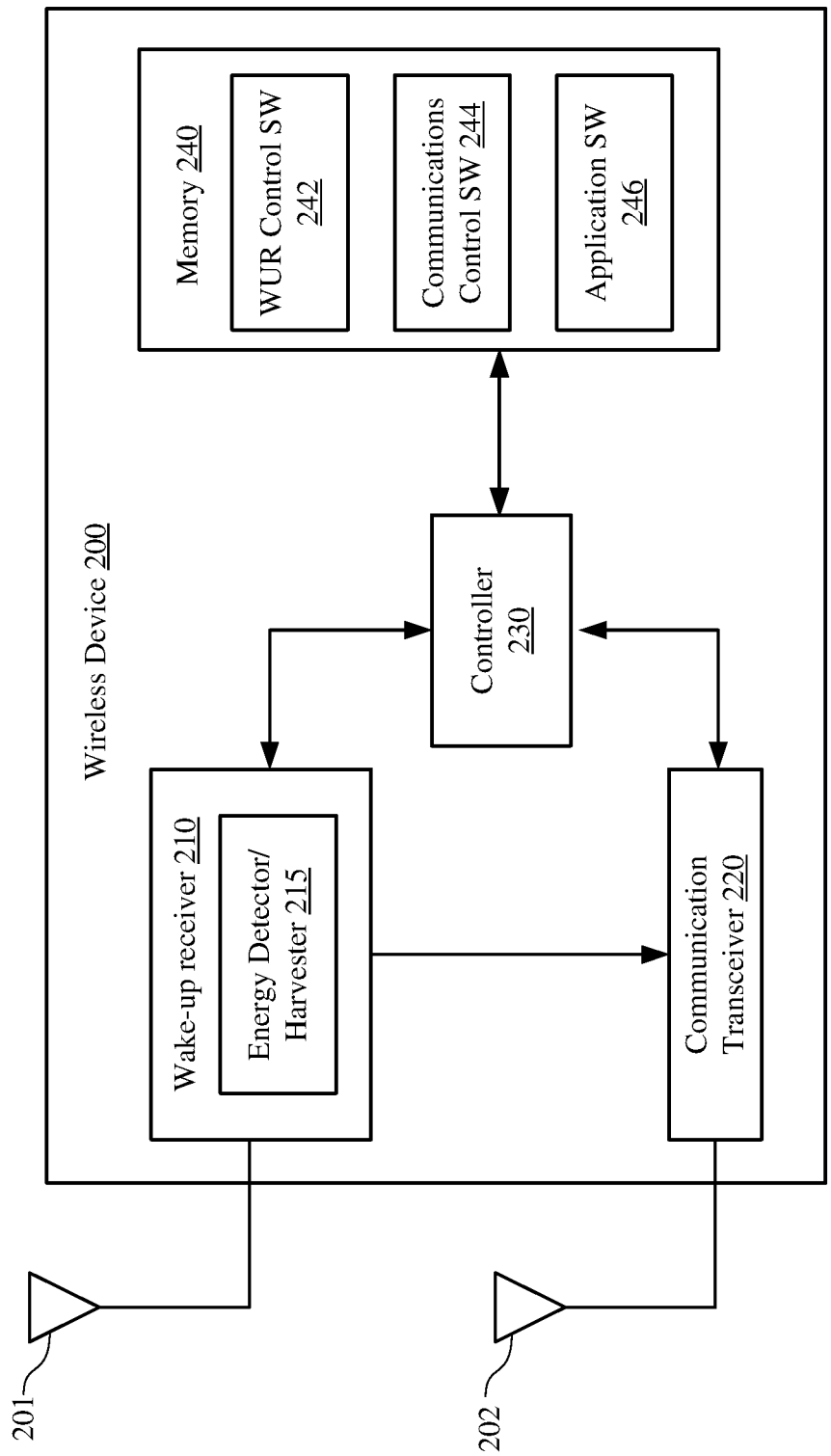
FIG. 2 shows a block diagram of an example wireless device.

FIG. 2 shows a block diagram of an example wireless device 200. The wireless device 200 may be an implementation of the second wireless device 120 of FIG. 1. The wireless device 200 may include a wake-up receiver (WUR) 210, a first antenna 201, a communication transceiver 220, a second antenna 202, a controller 230, and a memory 240. The first antenna 201 may be coupled to the WUR 210 and the second antenna 202 may be coupled to the communication transceiver 220. Although only one WUR 210 and one communication transceiver 220 are depicted, in other implementations, the wireless device 200 may include any feasible number of wake-up receivers and/or communication transceivers. Further, although the wireless device 200 is depicted with the first antenna 201 coupled to the WUR 210 and the second antenna 202 coupled to the communication transceiver 220, in other implementations, the wireless device 200 may include any feasible number of antennas. For example, a single antenna may be shared between the WUR 210 and the communication transceiver 220. In still other implementations, the wireless device 200 may include an antenna routing switch to flexibly couple any feasible antenna to the WUR 210 and the communication transceiver 220. Furthermore, the WUR 210 and the communication transceiver 220 may be implementations of the wake-up receiver 121 and the communication transceiver 125 of FIG. 1.

In some implementations, the WUR 210 may be coupled to the controller 230. The WUR 210 may be an OOK receiver and may include an energy detector/harvester 215. The energy detector/harvester 215 may detect the presence or absence of an RF signal within a frequency band. In some implementations, the RF signal may be in the 900 MHz, 2.4 GHz, 5 GHz, 60 GHz frequency bands, or any other feasible frequency band. Because OOK receivers may not demodulate RF signals, design of the WUR 210 may be relatively simple and may consume less power compared to conventional receivers, such as the communication transceiver 220. However, due to the simple design, the WUR 210 may have a low interference rejection, low signal sensitivity (in some cases signal sensitivity less than or equal to conventional receivers), and a limited communication range.

The energy detector/harvester 215 also may harvest and collect energy from received RF signals. For example, the energy detector/harvester 215 may include a charge-storage device (not shown for simplicity) to accumulate power for the WUR 210 or any other portion of the wireless device 200. In some example implementations, the WUR 210 may be powered completely or substantially by power collected by the energy detector/harvester 215. Thus, the WUR 210, the communication transceiver 220, and/or any other feasible portion of the wireless device 200 may power-up (e.g., turn on) when sufficient power has been collected and made available by the energy detector/harvester 215.

In some other implementations, the WUR 210 may receive and decode any feasible wireless communication signals. For example, the WUR 210 may receive and decode Bluetooth, BLE, Wi-Fi, LTE or any other RF communication signal. Thus, the WUR 210 may have a signal sensitivity commensurate with the associated RF communication signal. Even though the WUR 210 may consume more power receiving and decoding Bluetooth, BLE, Wi-Fi, LTE, or the like communication signals (especially compared to the OOK signals), the WUR 210 may still be powered completely or substantially by power collected by the energy detector/harvester 215.

The communication transceiver 220 may be coupled to the controller 230. The controller 230 may provide data to and receive data from the communication transceiver 220 associated with wireless communication signals. In some example implementations, the WUR 210 may be coupled to the communication transceiver 220. Upon detection of RF activity, the WUR 210 may cause the communication transceiver 220 to transition from a low-power (or first) mode to an active (or second) power mode. In some other implementations, upon detection of RF activity, the WUR 210 may signal the controller 230 to transition the wireless device 200 from the low-power (or first) mode to the active power (or second) mode.

The memory 240 may include a non-transitory computer-readable storage medium (such as one or more nonvolatile memory elements, such as EPROM, EEPROM, Flash memory, a hard drive, and so on) that may store the following software modules:

- a wake-up receiver (WUR) control software (SW) module 242 to control operations of the WUR 210 of the wireless device 200, for example, as described below with respect to FIGS. 3, 4A, 4B, and 5;
- a communication control SW module 244 to control wireless transmission and reception operations of the wireless device 200, for example, as described below for one or more operations described below with respect to FIGS. 3, 4A, 4B, and 5; and
- an application SW module 246 to control various operations and functions associated with the wireless device 200, for example, as described below with respect to FIGS. 3, 4A, 4B, and 5;

The controller 230, which may be coupled to the WUR 210, the communication transceiver 220, and the memory 240 may be any one or more suitable controllers or processors or the like capable of executing scripts or instructions of one or more software programs stored in the wireless device 200 (e.g., within the memory 240). In some implementations, the controller 230 may be implemented with a hardware controller, a processor, a state machine or other circuits to provide the functionality of the controller 230 executing instructions stored in the memory 240.

The controller 230 may execute the WUR control SW module 242 to detect and identify RF activity in a vicinity of the wireless device 200 using the WUR 210. In some implementations, executing the WUR control SW module 242 also may enable the WUR 210 to receive and decode RF signals including, for example, OOK modulated signals. In some other implementations, executing the WUR control SW module 242 may enable the WUR 210 to determine an energy pattern associated with a received RF signal and compare the determined energy pattern with one or more reference energy patterns to identify a wireless communication protocol associated with the detected RF activity. Determining and responding to energy patterns are described in more detail below in conjunction with FIG. 3.

In some implementations, the WUR 210 may enable a staged wake-up of the wireless device 200. For example, the wireless device 200 may operate in a low-power mode. Executing the WUR control SW module 242 may enable the WUR 210 to detect RF activity and the controller 230 to transition the wireless device 200 to the active power mode. The operation of the WUR control SW module 242 is described below with respect to FIGS. 3, 4A, 4B, and 5.

The controller 230 may execute the communications control SW module 244 to transmit and receive data via the communication transceiver 220. In some implementations, execution of the communications control SW module 244 may enable the wireless device 200 to transmit and receive wireless messages, beacons, and the like. For example, execution of the communications control SW module 244 may enable transmission and/or reception of Bluetooth, BLE, Wi-Fi, LTE or any other feasible wireless communications message.

The controller 230 may execute the application SW module 246 to perform operations associated with the wireless device 200. For example, execution of the application SW module 246 may enable the wireless device 200 to scan and report environment conditions (temperature, humidity, etc.), detect and report sensor readings (e.g., light sensor, door and window sensor, motion sensor information, etc.), or any other feasible task.

In some implementations, the wireless device 200 may periodically transmit one or more messages for nearby devices (such as the first wireless device 110). These messages may include environmental, sensor or any other feasible data or information. However, the wireless device 200 may needlessly consume power by transmitting messages when there are no nearby devices to receive the transmitted messages. To conserve power, the wireless device 200 may operate in a low-power mode and transmit wireless messages after detection of a nearby wireless device. This operation is described below in conjunction with FIG. 3.

Figure 3:
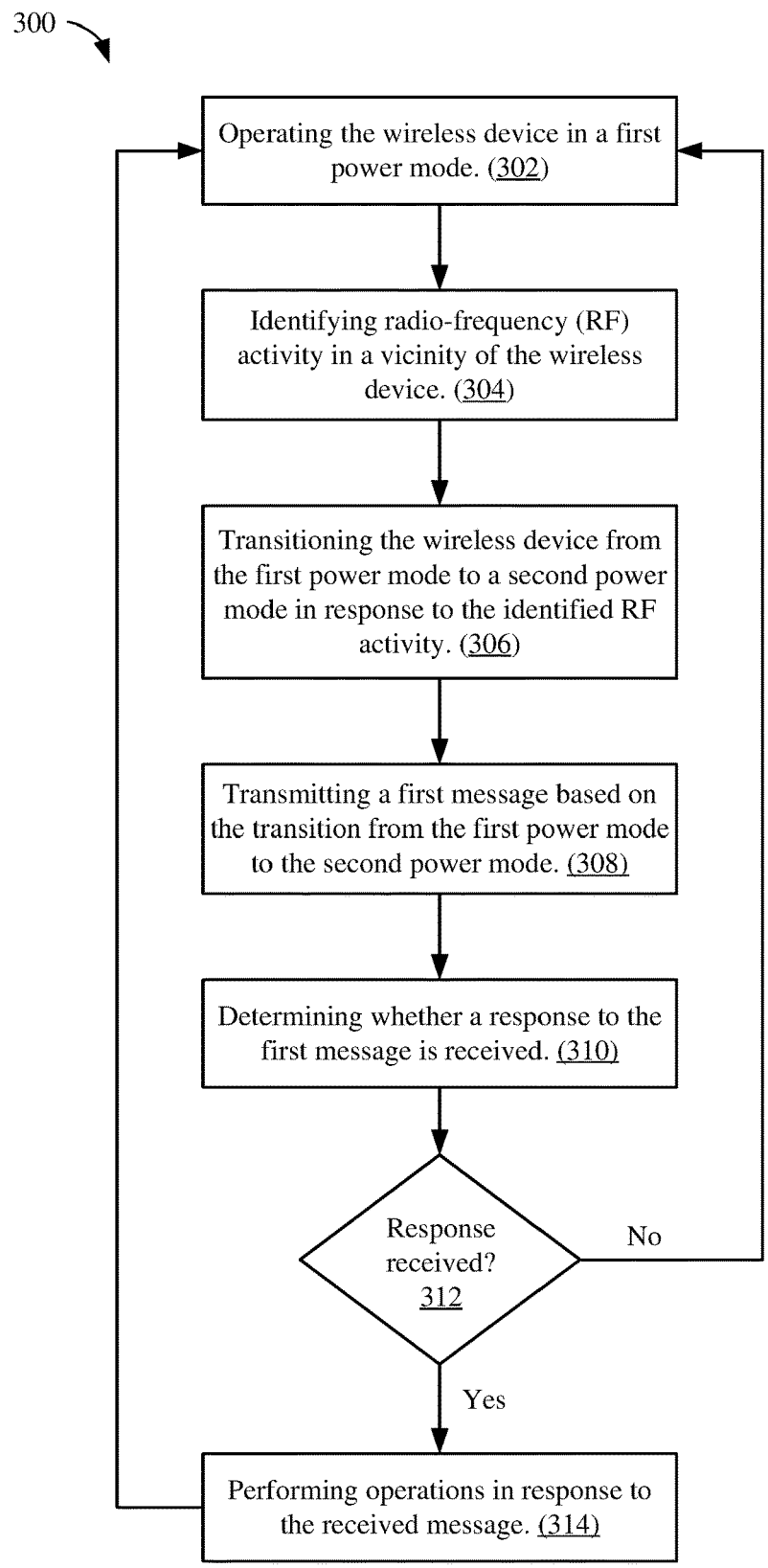
FIG. 3 shows a flowchart depicting an example operation for operating a wireless device, in accordance with some implementations.

FIG. 3 shows a flowchart depicting an example operation 300 for operating a wireless device, in accordance with some implementations. Although described herein as being performed by the wireless device 200 of FIG. 2, the operation 300 may be performed by the second wireless device 120 of FIG. 1, any other suitable wireless device, modules, sub-modules, or units. The operation 300 begins with the wireless device 200 operating in a first power mode (302). When operating in the first power mode, one or more portions or sections of the wireless device 200 may be disconnected from power or powered down to reduce power consumption. In some implementations, the WUR 210, however, may remain powered up in the first power mode, for example, to determine a presence of RF activity or energy in a vicinity of the wireless device 200. As discussed above with respect to FIG. 2, the WUR 210 may consume very low amounts of power, and thereby not substantially increase power consumption of the wireless device 200 when operating in the first power mode.

The operation 300 proceeds with identifying radio-frequency (RF) activity in a vicinity of the wireless device (304). In some implementations, the energy detector/harvester 215 of the WUR 210 may identify RF activity in a vicinity of the wireless device 200 by detecting and/or determining an energy pattern associated with a received RF signal and comparing that energy pattern with one or more reference energy patterns associated with one or more known wireless communication protocols. For example, the WUR 210 may identify RF activity associated with Bluetooth or BLE RF signals by determining energy patterns of the received RF signal and comparing the determined energy patterns with one or more energy patterns associated with Bluetooth or BLE RF signals. In this manner, the energy detector/harvester 215 may recognize RF energy patterns associated with Bluetooth or BLE RF signals without decoding these signals.

For example, a Bluetooth inquiry signal may have a first energy pattern (e.g., an energy signature) showing a first burst of RF energy during a first time period (e.g., a first 600 µS period), may have an absence of RF energy during a second time period (e.g., a second 600 µS period), and may have a second burst of RF energy during a third time period (e.g., a third 600 µS period). In another example, a BLE advertising signal may have a second energy pattern (e.g., distinct from the Bluetooth inquiry signal). The WUR 210 may compare, match and/or correlate the energy pattern of a received RF signal with the first energy pattern (the Bluetooth inquiry signal), the second energy pattern (the BLE advertising signal), or the energy pattern of any other feasible wireless communication protocol to identify the RF activity. Other energy patterns are possible but are not described here for simplicity. Note that the identified RF signals may be transmitted by mobile wireless devices that may or may not seek to communicate with the wireless device 200. Thus, these RF signals may advantageously be used to detect and at least partially identify nearby wireless devices without demodulating or decoding received RF signals. In some cases, the device transmitting the RF signals may repeat transmissions over time or within different channels. The WUR 210 and/or the energy detector/harvester 215 may not be sensitive to channels, but instead may receive and detect RF energy throughout many feasible frequency bands.

If the WUR 210 does not identify RF activity, then the operation 300 returns to block 302 and the wireless device 200 remains in the first power mode. On the other hand, if the WUR 210 identifies RF activity, then the operation 300 proceeds with transitioning the wireless device from the first power mode to a second power mode in response to the identified RF activity (306). In some example implementations, the WUR 210 may signal the controller 230 to transition the wireless device 200 from the first power mode to the second power mode. In this manner, a staged wake-up of the wireless device 200 may be performed, and power may be restored to one or more sections of the wireless device 200. In some implementations, the WUR 210 may have a relatively low latency, thereby enabling a quick detection and identification of RF activity and a quick transition from the first power mode to the second power mode.

Transitioning to the second mode may be include a single event or operation, or may include multiple events and/or operations. For example, transitioning to the second power mode may simply include an operation to enable the communication transceiver 220 to receive RF signals. In another example, transitioning to the second mode may include enabling the communication transceiver 220 and further determining if the communication transceiver 220 has received an RF signal that is intended for the wireless device 200. Thus, the second mode may include any number of steps or operations.

As described above, the received RF signal that causes the WUR 210 to identify RF activity may be a Bluetooth, BLE, Wi-Fi, LTE or other known communication signal. In other words, the received RF signal does not need to be a proprietary signal, but instead may be a well-known signal already used in wireless communications.

The operation 300 proceeds with transmitting a first message based on the transition from the first power mode to the second power mode (308). In some implementations, the communication transceiver 220 may transmit the first message, which may include a beacon message including identification information associated with the wireless device 200. Alternatively, or in addition, the first message may include environmental or sensor data associated with the wireless device 200.

The operation 300 proceeds with determining whether a response to the first message is received (310). In some implementations, the communication transceiver 220 determines if a response to the transmitted first message has been received. For example, the communication transceiver 220 may determine whether any Bluetooth, BLE or any other feasible wireless transmission responses have been transmitted to the wireless device 200. If a separate device, such as the first wireless device 110, has received the first message, then the receiving device may respond by transmitting a response to the wireless device 200.

If the communication transceiver 220 does not detect reception of a response to the first message, as tested at 312, then the operation 300 may return to block 302 and the wireless device 200 may return to operating in the first power mode. For example, if the wireless device 200 (via the WUR 210) has identified RF energy indicating a nearby device but there is no such nearby device trying to respond to the first message from the wireless device 200, then the wireless device 200 may return to operating in the first power mode at block 302. In some implementations, the communication transceiver 220 may be supplied power and be functional in the second power mode and may have power removed and not be functional in the first power mode.

On the other hand, if a response to the first message is received, as tested at 312, then the wireless device 200 may perform a number of operations in response to the received wireless message (314). In some implementations, the WUR 210 may have correctly identified a nearby communication device, for example, by receiving a response to the first message from the nearby communication device. The operations performed by the wireless device 200 in response to receiving the response may include scanning environmental conditions (such as by scanning light, door, temperature, and/or window sensors), transmitting requested information (such as environmental, sensor, or any other feasible information), or any other suitable operation. In some implementations, performing operations (in step 314) may include transitioning to other power modes. For example, in response to receiving a response to the first message, the wireless device 200 may transition to another power mode (a third, fourth, or fifth power mode, for example). In some embodiments, in the next power mode, power may be provided to another portion, section, or circuit of the wireless device 200, another transceiver or receiver may be enabled, or any other feasible operation may be performed.

After performing these operations, the wireless device 200 may return to operating in the first power mode at block 302. In some implementations, instead of returning to the first power mode, the wireless device 200 may transition to any feasible power mode.

As described above, the wireless device 200 may operate and transition between any number of power modes. In one example, the WUR 210 may be powered solely or substantially through harvested power. The wireless device 200 may operate in a first power mode where there is no harvested power available and thus the WUR 210 is not operating. The wireless device 200 may operate in a second power mode as an RF signal is received and makes harvested power available enabling the WUR 210 to operate. The wireless device 200 may then operate in a third power mode as the WUR 210 identifies the RF activity and enables the communication transceiver 220.

In some situations, it may be undesirable for the wireless device 200 to transmit any messages unless responding to a directed message. For example, in some environments, the wireless device 200 may not be allowed to broadcast periodic beacons or other non-directed messages, but rather may only respond to a directed message. This operation is described below in conjunction with FIG. 5.

Figure 4A:
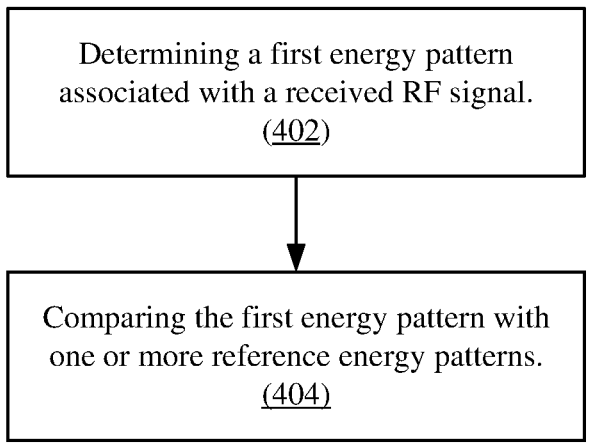
FIG. 4A shows a flowchart depicting an example operation for identifying RF activity in a vicinity of a wireless device, in accordance with some implementations.

FIG. 4A shows a flowchart depicting an example operation 400 for identifying RF activity in a vicinity of a wireless device, in accordance with some implementations. The operation 400, which may be one example of the process described in block 304 of FIG. 3, begins with determining a first energy pattern associated with a received RF signal (402). The operation 400 proceeds with comparing the first energy pattern with one or more reference energy patterns (404). In some aspects, at least one of the one or more reference patterns may be indicative of a known wireless communication protocol.

Figure 4B:
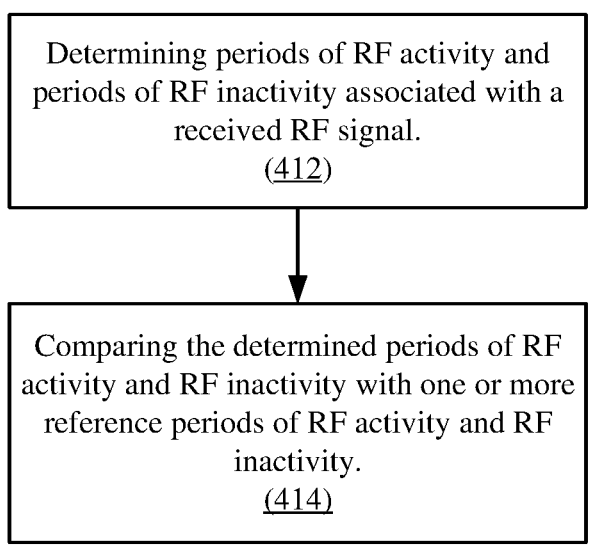
FIG. 4B shows a flowchart depicting another example operation for identifying RF activity in a vicinity of a wireless device, in accordance with some implementations.

FIG. 4B shows a flowchart depicting another example operation 410 for identifying RF activity in a vicinity of a wireless device, in accordance with some implementations. The operation 410, which may be another example of the process described in block 304 of FIG. 3, begins with determining periods of RF activity and periods of RF inactivity associated with a received RF signal (412). The operation 410 proceeds with comparing the determined periods of RF activity and RF inactivity with one or more reference periods of RF activity and RF inactivity (414). In some aspects, at least one of the one or more reference periods of RF activity and RF inactivity may be indicative of a known wireless communication protocol.

Figure 5:
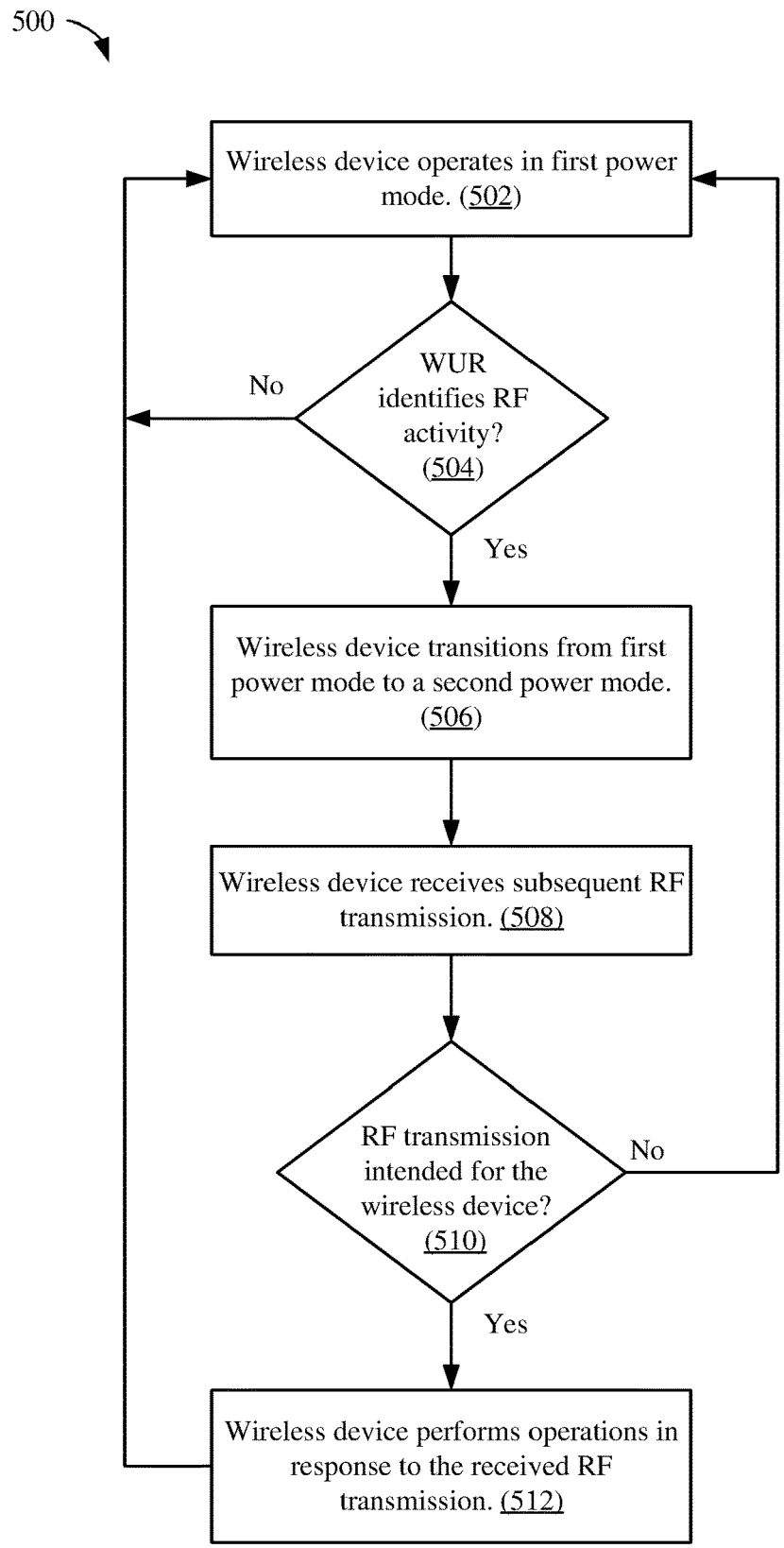
FIG. 5 shows a flowchart depicting another example operation for operating a wireless device, in accordance with some implementations.

FIG. 5 shows a flowchart depicting another example operation 500 for operating a wireless device, in accordance with some implementations. Although described herein as being performed by the wireless device 200 of FIG. 2, the operation 500 may be performed the second wireless device 120 of FIG. 1, or any other suitable wireless device, modules, sub-modules, or units The operation 500 begins with the wireless device 200 operating in a low-first power mode (502). In some implementations, the process of block 502 may be similar to the process of block 302 of FIG. 3. Next, the WUR 210 may identify RF activity (504). RF activity may be detected/identified as described above with respect to the process of block 304 of FIG. 3. If no RF activity is identified, then the operation 500 may return to block 502. On the other hand, if RF activity is identified, then the WUR 210 may cause the wireless device 200 to transition from the first power mode to a second power mode (506). In some implementations, the process of block 506 may be similar to the process of block 306 of FIG. 3 (e.g., a staged wake-up of the wireless device 200 may be performed). Thus, transitioning to the second power mode may include a single event or operation, or multiple events and/or operations. In some other implementations, the WUR 210 may transition the communication transceiver 220 of the wireless device 200 to the second power mode.

Next, the communication transceiver 220 may receive a subsequent RF transmission (508). Some RF messages, such as Bluetooth inquiry messages and/or BLE advertising messages, may be transmitted a plurality of times. A first transmission of the repeated message may cause the WUR 210 to detect and identify RF activity (at 504), and a subsequent transmission may cause the communication transceiver 220 to receive the transmission.

Next, the communication transceiver 220 may determine if the received subsequent RF transmission is intended for the wireless device 200 (510). In some implementations, some RF messages, such as Bluetooth inquiry messages and/or BLE advertising messages, may include a receiver ID (e.g., a device address) to identify the receiving device. Thus, the communication transceiver 220 (or in some cases the controller 230) may determine if the received message is intended for (e.g., directed to) the wireless device 200 by determining/decoding the receiver ID. If the received message is not intended for the wireless device 200, as tested at 510, then the operation 500 may return to block 502. On the other hand, if the received message is intended for the wireless device 200, then the wireless device 200 may perform one or more operations in response to the received message (512). For example, the wireless device 200 may scan local environmental conditions that may include scanning light, door, temperature, and/or window sensors. In some implementations, the process of block 512 may be similar to the process of block 34 of FIG. 3) where performing operations may include transitioning to other power modes. The wireless device 200 also may transmit beacon information and/or information requested by the received wireless message (such as environmental, sensor, or any other feasible information). Then, the operation 500 may return to block 502.

In the foregoing specification, the example implementations have been described with reference to specific exemplary implementations thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for operating a wireless device, comprising:
    operating the wireless device in a first power mode;
    identifying, by a first receiver of the wireless device, radio-frequency (RF) activity in a vicinity of the wireless device;
    transitioning the wireless device from the first power mode to a second power mode in response to the identified RF activity, wherein the wireless device consumes more power in the second power mode than in the first power mode; and
    transitioning the wireless device from the first power mode to the second power mode based on harvested power collected from RF signals by the first receiver.

2. The method of claim 1, wherein:
    identifying the RF activity includes receiving a first transmission of a first RF signal, and
    the second power mode includes demodulating, by a transceiver, a second transmission of the first RF signal.

3. The method of claim 2, wherein the first RF signal is least one of a Bluetooth Inquiry signal, a Bluetooth Low Energy advertising signal, and a phone inquiry signal.

4. The method of claim 2, further comprising:
    determining, by the transceiver, that the second transmission of the first RF signal is not intended for the wireless device; and
    transitioning the wireless device to the first power mode in response to the determination.

5. The method of claim 4, wherein the transceiver consumes less power than the first receiver.

6. The method of claim 4, wherein a signal sensitivity of the first receiver is less than or equal to the signal sensitivity of the transceiver.

7. The method of claim 1, wherein identifying the RF activity comprises:
    determining a first energy pattern associated with a received RF signal; and
    comparing the first energy pattern with one or more reference energy patterns indicative of a known wireless communication protocol.

8. The method of claim 1, wherein identifying the RF activity comprises:
    determining periods of RF activity and periods of RF inactivity associated with a received RF signal; and
    comparing the determined periods of RF activity and RF inactivity with one or more reference periods of RF activity and RF inactivity.

9. The method of claim 8, wherein at least one of the one or more reference periods of RF activity and RF inactivity is indicative of a known wireless communication protocol.

10. The method of claim 1, further comprising:
    transmitting a first wireless message based on the transition from the first power mode to the second power mode, the first wireless message identifying the wireless device.

11. The method of claim 1, wherein the wireless device is powered solely by the harvested power.

12. A wireless device comprising:
    a wake-up receiver configured to detect energy in radio-frequency (RF) signals;
    a controller; and
    a memory storing instructions that, when executed by the controller, cause the wireless device to:
        operate in a first power mode;
        identify radio-frequency (RF) activity in a vicinity of the wireless device;
        transition from the first power mode to a second power mode in response to the identified RF activity, wherein the wireless device is configured to consume more power in the second power mode than in the first power mode; and
        transition the wireless device from the first power mode to a second power mode in response to the identified RF activity, wherein the wireless device consumes more power in the second power mode than in the first power mode.

13. The wireless device of claim 12, wherein execution of the instructions to identify the RF activity causes the wireless device to receive a first transmission of a first RF signal; and
    execution of the instructions to transition the wireless device to the second power mode causes the wireless device to demodulate a second transmission of the first RF signal.

14. The wireless device of claim 13, wherein the first RF signal is least one of a Bluetooth Inquiry signal, a Bluetooth Low Energy advertising signal, a Wi-Fi signal and a phone inquiry signal.

15. The wireless device of claim 13, wherein execution of the instructions causes the wireless device to further:
    determine that the second transmission of the first RF signal is not intended for the wireless device; and
    transition the wireless device to the first power mode in response to the determination.

16. The wireless device of claim 12, wherein execution of the instructions causes the wireless device to further:
    transmit a first wireless message based on the transition from the first power mode to the second power mode, the first wireless message identifying the wireless device.

17. The wireless device of claim 16, wherein execution of the instructions causes the wireless device to further:
    receive, from another wireless device, a second wireless message responsive to the first wireless message.

18. A wireless device comprising:
    means for operating the wireless device in a first power mode;
    means for identifying radio-frequency (RF) activity in a vicinity of the wireless device;
    means for transitioning the wireless device from the first power mode to a second power mode in response to the identified RF activity, wherein the wireless device consumes more power in the second power mode than in the first power mode; and
    means for transitioning the wireless device from the first power mode to a second power mode in response to the identified RF activity, wherein the wireless device consumes more power in the second power mode than in the first power mode.

19. The wireless device of claim 18, wherein the means for identifying the RF activity is to receive a first transmission of a first RF signal, and wherein
    the second power mode is to demodulate a second transmission of the first RF signal.

* * * * *